United States Patent
Masnadi-Shirazi et al.

(10) Patent No.: US 11,264,017 B2
(45) Date of Patent: Mar. 1, 2022

(54) ROBUST SPEAKER LOCALIZATION IN PRESENCE OF STRONG NOISE INTERFERENCE SYSTEMS AND METHODS

(71) Applicant: SYNAPTICS INCORPORATED, San Jose, CA (US)

(72) Inventors: Alireza Masnadi-Shirazi, Irvine, CA (US); Francesco Nesta, Irvine, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/900,790

(22) Filed: Jun. 12, 2020

(65) Prior Publication Data
US 2021/0390952 A1 Dec. 16, 2021

(51) Int. Cl.
*G10L 15/20* (2006.01)
*H04S 3/00* (2006.01)

(52) U.S. Cl.
CPC ............. *G10L 15/20* (2013.01); *H04S 3/00* (2013.01)

(58) Field of Classification Search
CPC ............ G10L 15/20; G10L 15/22; G10L 2021/02166; G10L 19/008; G10L 2015/223; G10L 21/038; G10L 19/005; G10L 19/02; G10L 19/167; G10L 21/0208; G10L 21/0216; G10L 15/1815; G10L 15/26; G10L 17/00; G10L 19/0208; G10L 19/025; G10L 2021/02082; G10L 21/02; G10L 21/0232; G10L 21/0316; G10L 25/51; G10L 13/02; G10L 15/16; G10L 15/1822; G10L 15/30; G10L 19/26; G10L 2015/088; G10L 2015/227; G10L 2021/02087; G10L 21/0272; G10L 21/034; G10L 21/0364; G10L 25/30; G10L 25/48; G10L 13/0335; G10L 13/04; G10L 15/063; G10L 15/08; G10L 15/18; G10L 15/24; G10L 15/28; G10L 19/0204; G10L 19/032; G10L 19/173; G10L 19/20; G10L 19/22;
(Continued)

(56) References Cited

U.S. PATENT DOCUMENTS

2014/0149126 A1* 5/2014 Soulodre .................. H03G 9/00
704/500
2014/0372129 A1* 12/2014 Tzirkel-Hancock ... H04R 3/005
704/278
(Continued)

*Primary Examiner* — Akelaw Teshale
(74) *Attorney, Agent, or Firm* — Paradice & Li LLP (57) ABSTRACT

Systems and methods include a plurality of audio input components configured to generate a plurality of audio input signals, and a logic device configured to receive the plurality of audio input signals, determine whether the plurality of audio signals comprise target audio associated with an audio source, estimate a relative location of the audio source with respect to the plurality of audio input components based on the plurality of audio signals and a determination of whether the plurality of audio signals comprise the target audio, and process the plurality of audio signals to generate an audio output signal by enhancing the target audio based on the estimated relative location. The logic device is further configured to use relative transfer-based covariance to construct directional covariance matrix aligned across frequency bands and find a direction that minimizes beam power subject to distortionless criteria.

16 Claims, 5 Drawing Sheets

(58) Field of Classification Search
CPC . G10L 19/24; G10L 19/265; G10L 2015/225; G10L 21/14; G10L 25/18; G10L 25/69; H04S 3/00; H04R 3/005; H04R 1/406; H04R 29/005; H04R 2430/01; H04R 5/04; H04R 2430/20; H04R 2499/13; H04R 3/12; H04R 2430/03; H04R 2201/401; H04R 27/00; H04R 5/02; H04R 2420/07; H04R 29/00; H04R 2225/43; H04R 2420/01; H04R 25/43; H04R 2227/003; H04R 2227/007; H04R 2430/23; H04R 29/001; H04R 3/04; H04R 1/1083; H04R 1/326; H04R 1/403; H04R 2201/403; H04R 2225/41; H04R 2225/55; H04R 2460/07; H04R 25/407; H04R 25/554; H04R 25/558; H04R 3/00; H04R 3/02; H04R 5/033; H04R 1/028; H04R 1/323; H04R 2201/405; H04R 2203/12; H04R 2420/03; H04R 2430/21; H04R 2499/11; H04R 29/006; H04R 5/027; H04R 17/02; H04R 1/025; H04R 1/08; H04R 1/1008; H04R 1/1016; H04R 1/1041; H04R 1/22; H04R 1/24; H04R 1/245; H04R 1/40; H04R 2201/003; H04R 2201/021; H04R 2201/023; H04R 2201/40; H04R 2205/022; H04R 2205/024; H04R 2227/009; H04R 2410/01; H04R 2420/00; H04R 2420/05; H04R 2460/01; H04R 25/30; H04R 25/552; H04R 25/70; H04R 29/002; H04R 29/008; H04R 7/045

See application file for complete search history.

(56) References Cited

U.S. PATENT DOCUMENTS

| | | | | |
|---|---|---|---|---|
| 2015/0289065 | A1* | 10/2015 | Jensen | H04R 25/558 381/315 |
| 2016/0044410 | A1* | 2/2016 | Makinen | H04R 3/005 381/26 |
| 2016/0329061 | A1* | 11/2016 | Heber | G10L 19/005 |
| 2018/0213309 | A1* | 7/2018 | Laitinen | H04S 7/30 |
| 2019/0172476 | A1* | 6/2019 | Wung | G10L 21/0364 |
| 2019/0289420 | A1* | 9/2019 | Makinen | H04R 1/2811 |
| 2019/0325889 | A1* | 10/2019 | Li | G10L 21/0224 |
| 2019/0355373 | A1* | 11/2019 | Nesta | H04S 7/303 |
| 2020/0177994 | A1* | 6/2020 | Davis | G10L 21/0208 |

* cited by examiner

ROBUST SPEAKER LOCALIZATION IN PRESENCE OF STRONG NOISE INTERFERENCE SYSTEMS AND METHODS

TECHNICAL FIELD

The present disclosure, in accordance with one or more embodiments, relates generally to audio signal processing, and more particularly for example, to systems and methods for robust speaker localization in the presence of strong noise interference.

BACKGROUND

Smart speakers and other voice-controlled devices and appliances have gained popularity in recent years. Smart speakers often include an array of microphones for receiving audio inputs (e.g., verbal commands of a user) from an environment. When target audio (e.g., the verbal command) is detected in the audio inputs, the smart speaker may translate the detected target audio into one or more commands and perform different tasks based on the commands. One challenge of these smart speakers is to efficiently and effectively isolate the target audio (e.g., the verbal command) from noise in the operating environment. The challenges are exacerbated in noisy environments where the target audio may come from any direction relative to the microphones.

In view of the foregoing, there is a need for improved systems and methods for processing audio signals that are received in a noisy environment.

SUMMARY

The present disclosure provides systems and methods that improve audio signal processing in noisy environments. Various embodiments of systems and methods are disclosed herein and include a plurality of audio input components configured to generate a plurality of audio input signals, and a logic device configured to receive the plurality of audio input signals, determine whether the plurality of audio signals comprise target audio associated with an audio source, estimate a relative location of the audio source with respect to the plurality of audio input components based on the plurality of audio signals and a determination of whether the plurality of audio signals comprise the target audio, and process the plurality of audio signals to generate an audio output signal by enhancing the target audio based on the estimated relative location. The logic device is further configured to use relative transfer-based covariance to construct directional covariance matrix aligned across frequency bands and find a direction that minimizes beam power subject to distortionless criteria.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Systems and methods for detecting and enhancing target audio in a noisy environment are disclosed herein.

In various embodiments, a microphone array having a plurality of microphones senses target audio and noise in an operating environment and generates an audio signal for each microphone. Speaker localization in the form of Time Difference of Arrival (TDOA) or Direction of Arrival (DOA) using microphone arrays is a well-known problem in far-field voice processing with applications include applications where estimating the physical bearing of speaker relative to the array is of interest such as in surveillance, human-machine interaction, camera steering, etc., and applications where estimating and tracking the location information of the speaker(s) leads to Voice Activity Detector(s) (VAD) that can supervise speaker enhancement and noise reduction tasks in methods such as beamforming or Blind Source Separation (BSS).

In the present disclosure systems and methods are described that robustly estimate the TDOA/DOA of one or more concurrent speakers when a stronger dominant noise/interference source (e.g., loud TV noise) is consistently present. In some embodiments, the system works by employing some features of the Generalized Eigenvalue (GEV) beamformer, which allows for the estimate of the target speaker's unique spatial fingerprint or Relative Transfer Function (RTF). The target RTF is estimated by effectively nulling the dominant noise source. By applying a modified TDOA/DOA estimation method that uses the RTF as an input, the systems described herein can obtain a robust localization estimate of the target speaker. If multiple target speakers are active in the presence of a stronger noise source (e.g., stronger than the target speakers), with proper tuning the RTF of each source can be estimated intermittently and fed to a multi-source tracker, leading to a robust VAD for each source separately that can drive the multi-stream voice enhancement system.

The disclosure provides many advantages over conventional systems and methods. TDOA/DOA methods typically operate by employing the spatial correlation matrix of the raw input obtained from the microphone arrays, then scanning all possible directions/delays to form a pseudo-likelihood with its peak(s) corresponding to the TDOA/DOA of the source(s). These methods are suitable when a single source is present or, if multiple sources are present, their powers are roughly on the same level. However, in the case when a target speaker is buried in the presence of a stronger noise or interference source, e.g., when the Signal to Noise Ratio (SNR) is negative, such methods fail as the peak corresponding to the weaker target speech is not well distinguished or completely vanishes with respect to the peak corresponding to the stronger noise source. In various embodiments, methods proposed here use modified TDOA/DOA estimation method that uses the estimated target RTF as an input rather than the spatial correlation matrix of the microphone array raw signals. Since the RTF is estimated by effectively nulling the dominant noise source, it contains less distorted spatial information of target speech than the noisy raw microphone array correlation matrix, therefore, an improved localization estimate of the target speaker can be obtained.

The present disclosure may be used in with beamforming techniques incorporating generalized eigenvector tracking to enhance the target audio in the received audio signals. In one or more embodiments, a multi-channel audio input signal is received through an array of audio sensors (e.g., microphones). Each audio channel is analyzed to determine whether target audio is present, for example, whether a target person is actively speaking. The system tracks target and noise signals to determine a location of a target audio source (e.g., a target person) relative to the microphone array. An improved generalized eigenvector process may be used to determine a direction of the target audio in real time. The determined direction may then be used by a spatial filtering process, such as a minimum variance distortionless response (MVDR) beamformer, to enhance the target audio. After the audio input signals are processed, an enhanced audio output signal may be used, for example, as audio output transmitted to one or more speakers, as voice communications in a telephone or voice over IP (VoIP) call, for speech recognition or voice command processing, or other voice application. A modified generalized eigenvector (GEV) system may be used to efficiently determine the direction of a target audio source in real-time, with or without the knowledge of the geometry of the array of microphones or the audio environment.

Figure 1:
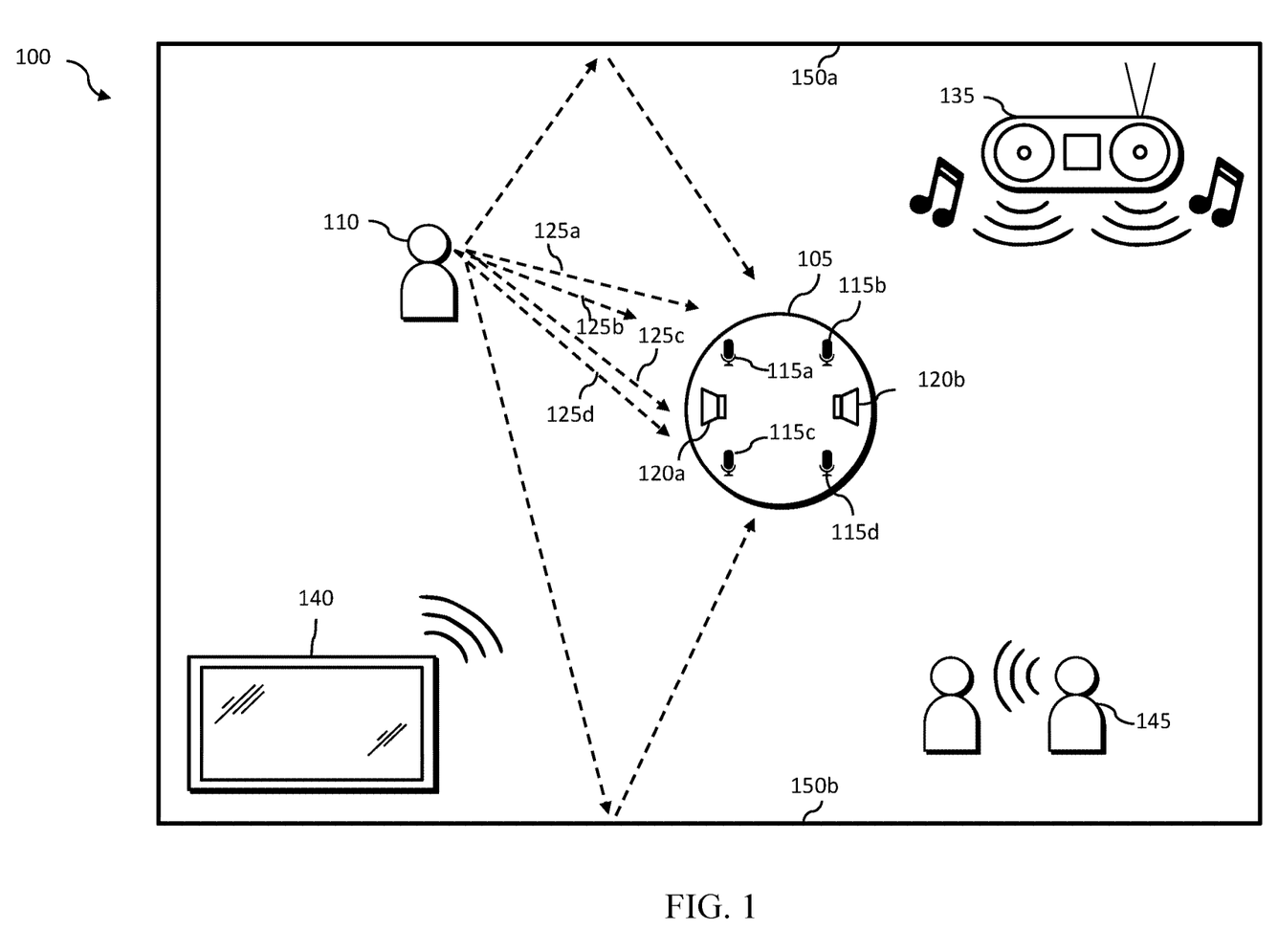
FIG. 1 illustrates an example operating environment for an audio processing device, in accordance with one or more embodiments of the disclosure.

FIG. 1 illustrates an example operating environment 100 in which an audio processing system may operate according to various embodiments of the disclosure. The operating environment 100 includes an audio processing device 105, a target audio source 110, and one or more noise sources 135-145. In the example illustrated in FIG. 1, the operating environment 100 is illustrated as a room, but it is contemplated that the operating environment may include other areas, such as an inside of a vehicle, an office conference room, rooms of a home, an outdoor stadium or an airport. In accordance with various embodiments of the disclosure, the audio processing device 105 may include two or more audio sensing components 115a-115d (e.g., microphones) and, optionally, one or more audio output components 120a-120b, such as one or more loudspeakers.

The audio processing device 105 may be configured to sense sound via the audio sensing components 115a-115d and generate a multi-channel audio input signal, comprising two or more audio input signals. The audio processing device 105 may process the audio input signals using audio processing techniques disclosed herein to enhance the audio signal received from the target audio source 110. For example, the processed audio signals may be transmitted to other components within the audio processing device 105, such as a speech recognition engine or voice command processor, or to an external device. Thus, the audio processing device 105 may be a standalone device that processes audio signals, or a device that turns the processed audio signals into other signals (e.g., a command, an instruction, etc.) for interacting with or controlling an external device. In other embodiments, the audio processing device 105 may be a communications device, such as mobile phone or voice-over-IP (VoIP) enabled device, and the processed audio signals may be transmitted over a network to another device for output to a remote user. The communications device may also receive processed audio signals from a remote device and output the processed audio signals via the audio output components 120a-120b.

The target audio source 110 may be any source that produces target audio detectable by the audio processing device 105. The target audio may be defined based on criteria specified by user or system requirements. For example, the target audio may be defined as human speech, a sound made by a particular animal or a machine. In the illustrated example, the target audio is defined as human speech, and the target audio source 110 is a person. In addition to target audio source 110, the operating environment 100 may include one or more noise sources 135-145. In various embodiments, sound that is not target audio is processed as noise. In the illustrated example, the noise sources 135-145 may include a loud speaker 135 playing music, a television 140 playing a television show, movie or sporting event, and background conversations between non-target speakers 145. It will be appreciated that other noise sources may be present in various operating environments.

It is noted that the target audio and noise may reach the microphones 115a-115d of the audio processing device 105 from different directions. For example, the noise sources 135-145 may produce noise at different locations within the room, and the target audio source 110 (e.g., a person) may speak while moving between locations within the room. Furthermore, the target audio and/or the noise may reflect off fixtures (e.g., walls) within the room. For example, consider the paths that the target audio may traverse from the target audio source 110 to reach each of the microphones 115a-115d. As indicated by arrows 125a-125d, the target audio may directly travel from the target audio source 110 to the microphones 115a-115d, respectively. Additionally, the target audio may reflect off the walls 150a and 150b, and reach the microphones 115a-115d indirectly from the target audio source 110, as indicated by the arrows. According to various embodiments of the disclosure, the audio processing device 105 may use the audio processing techniques disclosed herein to estimate a location of the target audio source 110 based on the audio input signals received by the microphones 115a-115d, and process the audio input signals to enhance the target audio and suppress noise based on the estimated location.

Figure 2:
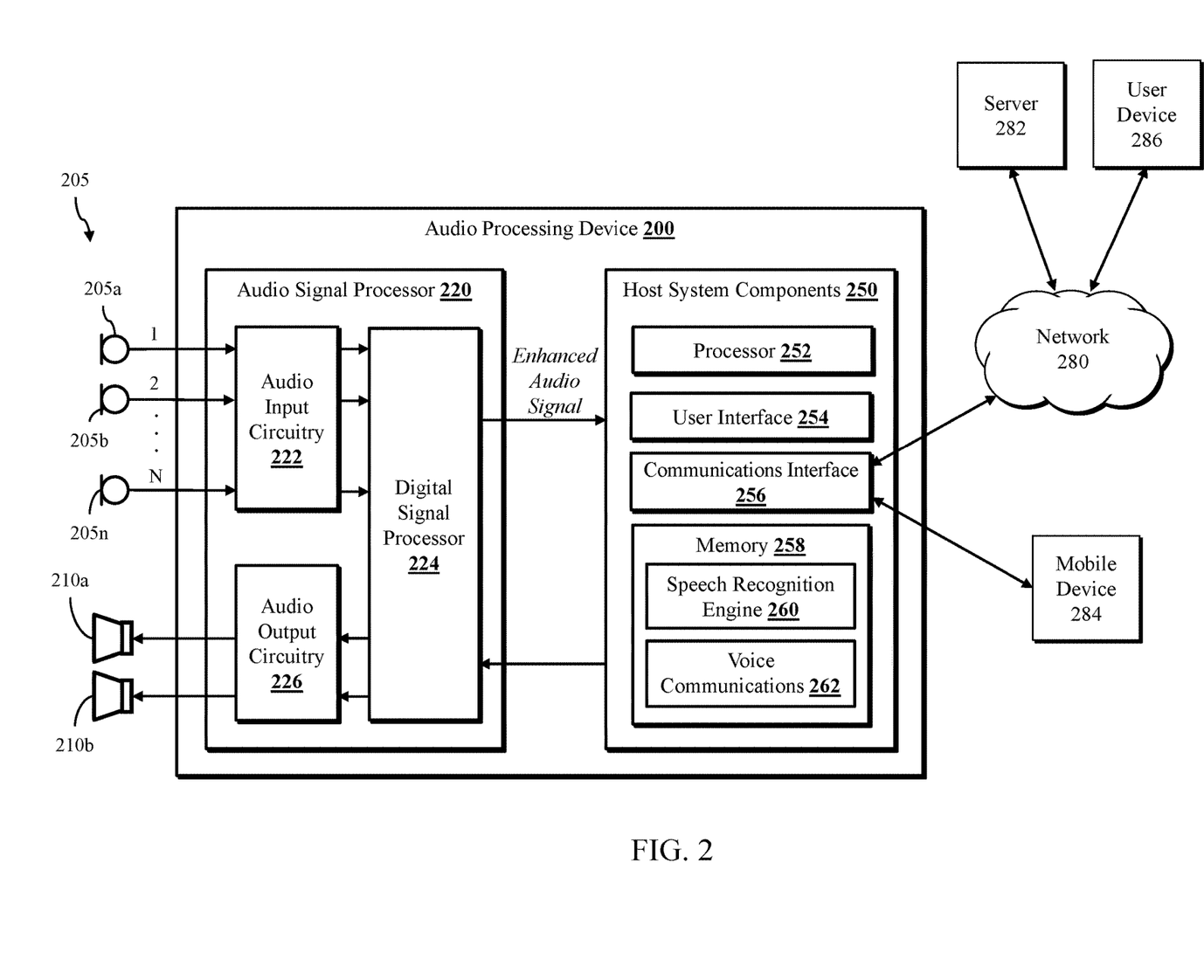
FIG. 2 is a block diagram of an example audio processing device, in accordance with one or more embodiments of the disclosure.

FIG. 2 illustrates an example audio processing device 200 according to various embodiments of the disclosure. In some embodiments, the audio processing device 200 may be implemented as the audio processing device 105 of FIG. 1. The audio processing device 200 includes an audio sensor array 205, an audio signal processor 220 and host system components 250.

The audio sensor array 205 comprises two or more sensors, each of which may be implemented as a transducer that converts audio inputs in the form of sound waves into an audio signal. In the illustrated environment, the audio sensor array 205 comprises a plurality of microphones 205a-205n, each generating an audio input signal which is provided to the audio input circuitry 222 of the audio signal processor 220. In one embodiment, the sensor array 205 generates a multichannel audio signal, with each channel corresponding to an audio input signal from one of the microphones 205a-n.

The audio signal processor 220 includes the audio input circuitry 222, a digital signal processor 224 and optional audio output circuitry 226. In various embodiments the audio signal processor 220 may be implemented as an integrated circuit comprising analog circuitry, digital circuitry and the digital signal processor 224, which is operable to execute program instructions stored in firmware. The audio input circuitry 222, for example, may include an interface to the audio sensor array 205, anti-aliasing filters, analog-to-digital converter circuitry, echo cancellation circuitry, and other audio processing circuitry and components as disclosed herein. The digital signal processor 224 is operable to process a multichannel digital audio signal to generate an enhanced audio signal, which is output to one or more host system components 250. In various embodiments, the digital signal processor 224 may be operable to perform echo cancellation, noise cancellation, target signal enhancement, post-filtering, and other audio signal processing functions.

The optional audio output circuitry 226 processes audio signals received from the digital signal processor 224 for output to at least one speaker, such as speakers 210a and 210b. In various embodiments, the audio output circuitry 226 may include a digital-to-analog converter that converts one or more digital audio signals to analog and one or more amplifiers for driving the speakers 210a-210b.

The audio processing device 200 may be implemented as any device operable to receive and enhance target audio data, such as, for example, a mobile phone, smart speaker, tablet, laptop computer, desktop computer, voice controlled appliance, or automobile. The host system components 250 may comprise various hardware and software components for operating the audio processing device 200. In the illustrated embodiment, the system components 250 include a processor 252, user interface components 254, a communications interface 256 for communicating with external devices and networks, such as network 280 (e.g., the Internet, the cloud, a local area network, or a cellular network) and mobile device 284, and a memory 258.

The processor 252 and digital signal processor 224 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 250 are configured to interface and communicate with the audio signal processor 220 and the other system components 250, such as through a bus or other electronic communications interface.

It will be appreciated that although the audio signal processor 220 and the host system components 250 are shown as incorporating a combination of hardware components, circuitry and software, in some embodiments, at least some or all of the functionalities that the hardware components and circuitries are operable to perform may be implemented as software modules being executed by the processor 252 and/or digital signal processor 224 in response to software instructions and/or configuration data, stored in the memory 258 or firmware of the digital signal processor 224.

The memory 258 may be implemented as one or more memory devices operable to store data and information, including audio data and program instructions. Memory 258 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 252 may be operable to execute software instructions stored in the memory 258. In various embodiments, a speech recognition engine 260 is operable to process the enhanced audio signal received from the audio signal processor 220, including identifying and executing voice commands. Voice communications components 262 may be operable to facilitate voice communications with one or more external devices such as a mobile device 284 or user device 286, such as through a voice call over a mobile or cellular telephone network or a VoIP call over an IP network. In various embodiments, voice communications include transmission of the enhanced audio signal to an external communications device.

The user interface components 254 may include a display, a touchpad display, a keypad, one or more buttons and/or other input/output components operable to enable a user to directly interact with the audio processing device 200.

The communications interface 256 facilitates communication between the audio processing device 200 and external devices. For example, the communications interface 256 may enable Wi-Fi (e.g., 802.11) or Bluetooth connections between the audio processing device 200 and one or more local devices, such mobile device 284, or a wireless router providing network access to a remote server 282, such as through the network 280. In various embodiments, the communications interface 256 may include other wired and wireless communications components facilitating direct or indirect communications between the audio processing device 200 and one or more other devices.

Figure 3:
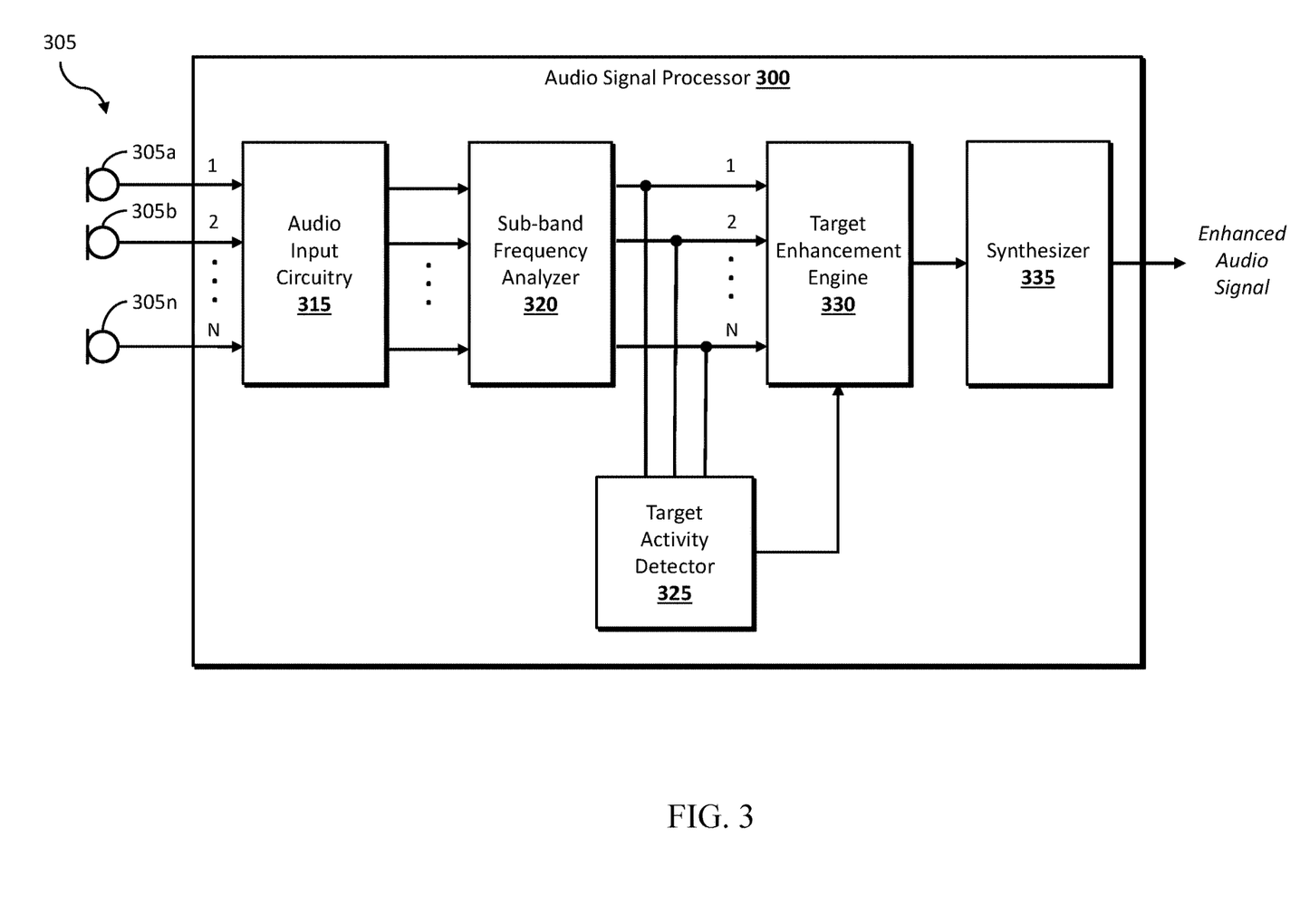
FIG. 3 is a block diagram of example audio signal processor, in accordance with one or more embodiments of the disclosure.

FIG. 3 illustrates an exemplary audio signal processor 300 according to various embodiments of the disclosure. In some embodiments, the audio input processor 300 is embodied as one or more integrated circuits including analog and digital circuitry and firmware logic implemented by a digital signal processor, such as digital signal processor 224 of FIG. 2. As illustrated, the audio signal processor 300 includes audio input circuitry 315, a sub-band frequency analyzer 320, a target activity detector 325, a target enhancement engine 330, and a synthesizer 335.

The audio signal processor 300 receives a multi-channel audio input from a plurality of audio sensors, such as a sensor array 305 comprising at least two audio sensors 305a-n. The audio sensors 305a-305n may include microphones that are integrated with an audio processing device, such as the audio processing device 200 of FIG. 2, or external components connected thereto. The arrangement of the audio sensors 305a-305n may be known or unknown to the audio input processor 300 according to various embodiments of the disclosure.

The audio signals may be processed initially by the audio input circuitry 315, which may include anti-aliasing filters, analog to digital converters, and/or other audio input circuitry. In various embodiments, the audio input circuitry 315 outputs a digital, multichannel, time-domain audio signal having N channels, where N is the number of sensor (e.g., microphone) inputs. The multichannel audio signal is input to the sub-band frequency analyzer 320, which partitions the multichannel audio signal into successive frames and decomposes each frame of each channel into a plurality of frequency sub-bands. In various embodiments, the sub-band frequency analyzer 320 includes a Fourier transform process and outputs a plurality of frequency bins. The decomposed audio signals are then provided to the target activity detector 325 and the target enhancement engine 330.

The target activity detector 325 is operable to analyze the frames of one or more of the audio channels and generate a signal indicating whether target audio is present in the current frame. As discussed above, target audio may be any audio to be identified by the audio system. When the target audio is human speech, the target activity detector 325 may be implemented as a voice activity detector. In various embodiments, a voice activity detector operable to receive a frame of audio data and make a determination regarding the presence or absence of the target audio may be used. In some embodiments, the target activity detector 325 may apply target audio classification rules to the sub-band frames to compute a value. The value is then compared to the threshold value for generating a target activity signal. In various embodiments, the signal generated by the target activity detector 325 is a binary signal, such as an output of '1' to indicate a presence of target speech in the sub-band audio frame and the binary output of '0' to indicate an absence of target speech in the sub-band audio frame. The generated binary output is provided to the target enhancement engine 330 for further processing of the multichannel audio signal. In other embodiments, the target activity signal may comprise a probability of target presence, an indication that a determination of target presence cannot be made, or other target presence information in accordance with system requirements.

The target enhancement engine 330 receives the sub-band frames from the sub-band frequency analyzer 320 and the target activity signal from the target activity detector 325. In accordance with various embodiments of the disclosure, the target enhancement engine 330 uses a modified generalized eigenvalue beamformer to process the sub-band frames based on the received activity signal, as will be described in more detail below. In some embodiments, processing the sub-band frames comprises estimating a location of the target audio source (e.g., the target audio source 110) relative to the sensor array 305. Based on the estimated location of the target audio source, the target enhancement engine 330 may enhance the portion of the audio signal determined to be from the direction of the target audio source and suppress the other portions of the audio signal which are determined to be noise.

After enhancing the target audio signal, the target enhancement engine 330 may pass the processed audio signal to the synthesizer 335. In various embodiments, the synthesizer 335 reconstructs one or more of the multichannel audio signals on a frame-by-frame basis by combing the sub-bands to form an enhanced time-domain audio signal. The enhanced audio signal may then be transformed back to the time domain and sent to a system component or external device for further processing.

Figure 4:
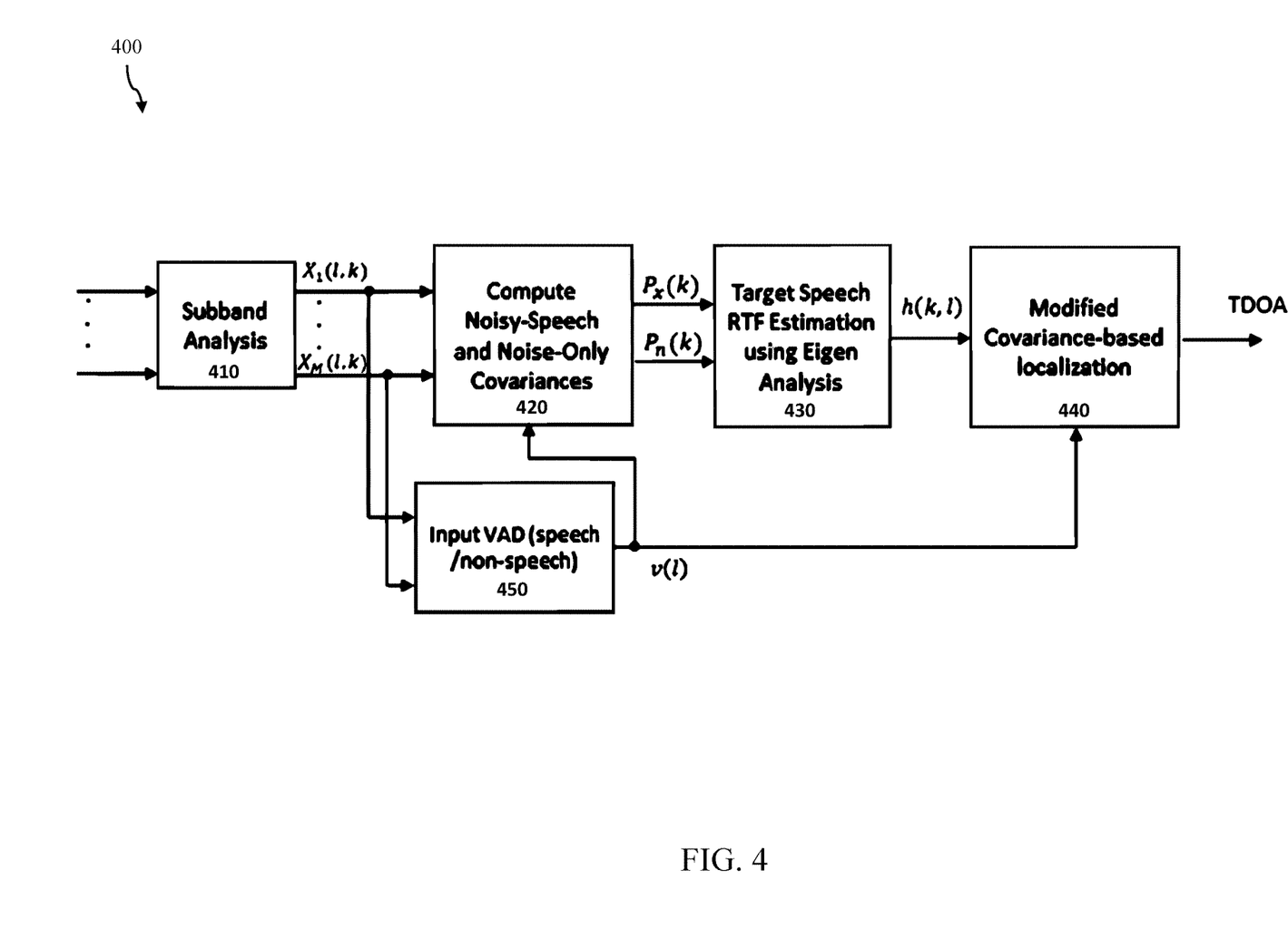
FIG. 4 illustrates an example system architecture providing robust speaker localization in the presence of strong noise interference, in accordance with one or more embodiments.

FIG. 4 illustrates an example system architecture 400 providing robust speaker localization in the presence of strong noise interference, in accordance with one or more embodiments. The system architecture 400 according to various embodiments of the disclosure may be implemented as a combination of digital circuitry and logic performed by a digital signal processor. The system architecture 400 includes a subband analysis block 410, a covariance computation block 420, input voice activity detector (input VAD 450) that makes speech/non-speech determinations, a target speech relative transfer function estimation using Eigen analysis module (RTF estimation module 430), and a modified covariance-based localization module 440.

The input VAD 450 drives the RTF estimation module 430 and operates to identify (with high confidence) time-instants where non-speech like noise is isolated. In other words, the input VAD 450 may be tuned to produce less false negatives (instances where speech is active but VAD falsely claims speech is absent) than false positives (instances where speech is absent but VAD falsely claims speech is active). A reason for this has to do with the process performed by the RTF estimation module 430 which will be discussed next.

In the RTF estimation process, noise-only and noisy-speech covariance matrices are computed using the VAD 450. The noise covariance matrix is used to null the noise, but since during false negatives the covariance of the noise is wrongfully updated with actual speech-like features, it may end up cancelling speech instead, which degrades the accuracy of RTF of target speech as well and renders it less reliable for localization. Because we are dealing with lower SNRs, traditional power-based features for construction of the VAD do not perform at a desired level and instead rely on spectral-based classifiers trained to discriminate between speech and non-speech audio.

The present disclosure overcomes these limitations with conventional system. An example process 500 will now be described with refence to FIGS. 4 and 5. In the following discussion we indicate with v(l) the state variable of the VAD 450 which is defined to assume for the observed frame l a value equal to "1" or "0" if it is determined that speech is present or absent, respectively.

1) RTF Estimation Using Eigen Analysis

We denote with $x_m(t)$, m=1, ..., M the sampled time domain audio signal recorded at the $m^{th}$ microphone for a total of M microphones. Through the subbband analysis 410 the signal is transformed to a time-frequency domain denoted as $X_m(k,l)$ where k indicates the frequency band index and l indicates the subband time index. We denote the vector of time-frequency segments of the entire array as $$X(k,l)=[X_1(k,l), \ldots, X_M(k,l)]^T.$$

Figure 5:
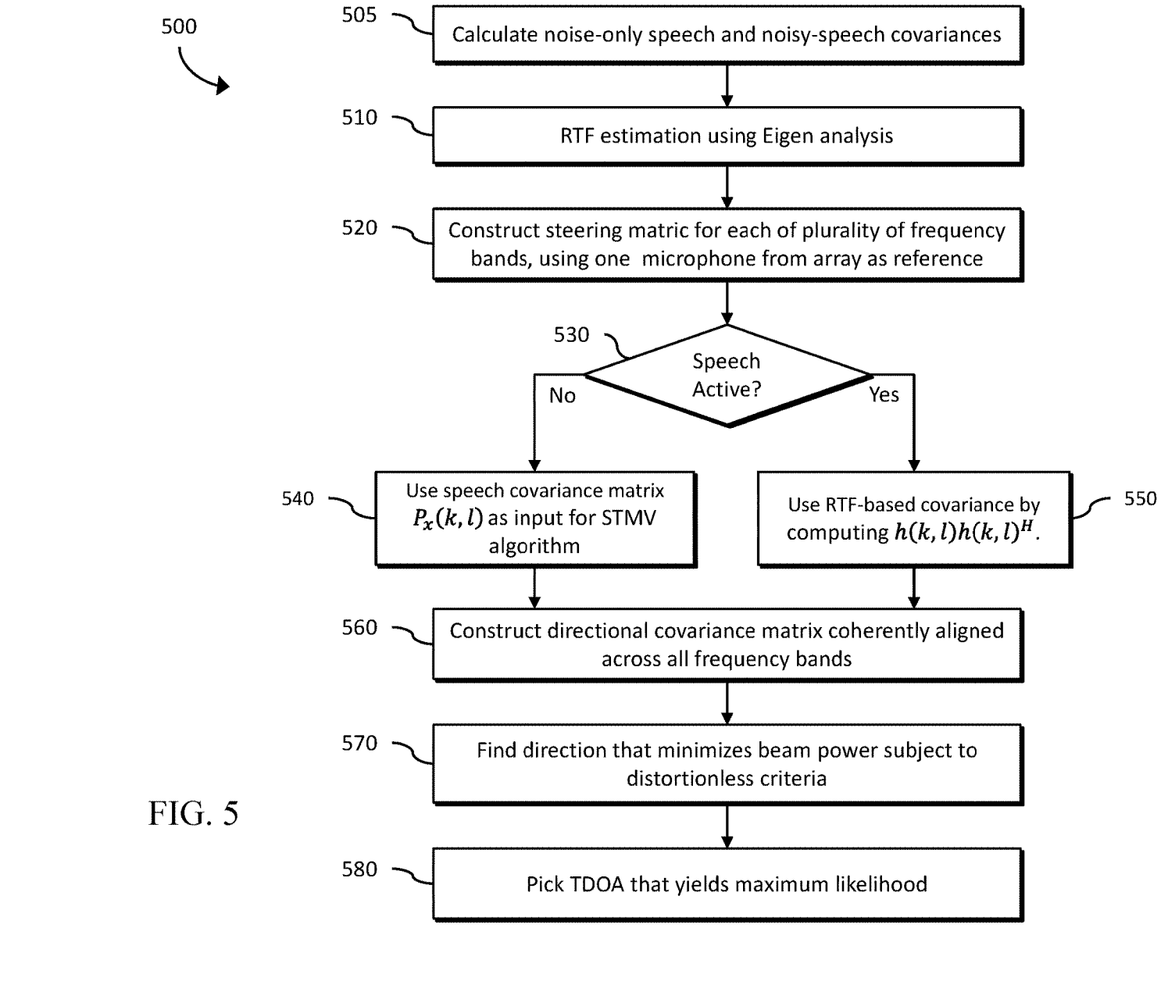
FIG. 5 is a flow diagram illustrating an example process for performing a real-time audio signal processing, in accordance with one or more embodiments of the disclosure.

Next, in step 505, the noisy-speech and noise-only speech covariances are computed using processing block. The covariance of the noise-only segments using the input VAD is computed in block 420 as $$P_n(k) = \sum_l (1 - v(l))X(k, l)X(k, l)^H$$

In an on-line implementation, the covariance matrix is updated with the frames l and can be estimated with a first-order recursive smoothing as $$P_n(k,l)=\alpha(l)P_n(k,l-1)+(1-\alpha(l))X(k,l)X(k,l)^H$$

with $\alpha(l)=\max(\gamma,v(l))$, where $\gamma$ is a smoothing constant (<1). Similarly, the noisy-signal covariance can be computed as follows $$P_x(k,l)=\beta(l)P_x(k,l-1)+(1-\beta(l))X(k,l)X(k,l)^H$$

with $\beta(l)=\max(\gamma,1-v(l))$. In step 510, the RTF of target speech source, denoted by h(k,l), is obtained by finding the principal eigen vector of $P_n^{-1}(k,l)P_x(k,l)$ using a blind acoustic beamforming process based on general eigenvalue decomposition (processing block 430).

The choice of the parameter y determines how fast such covariance matrices are updated. If multiple speakers are active simultaneously in the presence of a strong background noise source, a faster rate may be required so that $P_x$ can capture the intermittent switch between target sources, which can later be fed into a tracker.

2) Covariance-Based Localization

A microphone is picked as a reference microphone (e.g., the first microphone) and used to extract the TDOA information of the source(s) with respect the reference microphone. The TDOA estimation method used here is based on a steered minimum variance (STMV) beamformer and will now be described.

In step 520, a steering matrix is constructed for each frequency band as follows $$T_k(\tau)=\text{diag}([1 e^{-j2\pi f_k 96\,2} \ldots e^{-j2\pi f_k 96\,M}]^T)$$

where $\tau_m$ is the TDOA of $m^{th}$ microphone with respect to the first microphone for different scans (linear scan or scan that corresponds to different azimuths and elevations), $\tau=[\tau_2 \ldots \tau_M]^T$, and $f_k$ is the frequency at band k.

When speech is active (step 530), v(l)=1, and instead of using the noisy-speech spatial covariance matrix, $P_x(k,l)$, as the input covariance for the STMV algorithm (step 540), we use an RTF-based covariance by computing $h(k,l)h(k,l)^H$, in step 550. We note that since in the estimation of the RTF h(k,l), the effect of noise is intrinsically nullified, and we can view this spatial covariance stemming from speech-only components. Also, when speech is absent, v(l)=0, we can skip this computation and use the previous estimate. Thus, we have the speech-only covariance matrix to be $$P_{RTF}(k,l)=(1-v(l))P_{RTF}(k,l-1)+v(l)h(k,l)h(k,l)^H$$

Next, in step 560, the system constructs the directional covariance matrix coherently aligned across all frequency bands as follows:

$$C(\tau, l) = \sum_k T_k(\tau) P_{RTF}(k, l) T_k(\tau)^H$$

Next, in step 570, we find the direction that minimizes beam power subject to a distortionless criteria with its equivalent pseudo-likelihood solution becoming $$\mathcal{L}^{STMV}(\tau, l) = \frac{1}{1^T C^{-1}(\tau, l) 1}$$

where $1=[1, \ldots, 1]^T$.

In step 580, the TDOA that yields maximum likelihood is then picked, denoted by $$\tau^*(l)=\text{argmax}_\tau \mathcal{L}^{STMV}(\tau,l).$$

The foregoing disclosure is not intended to limit the present invention to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize advantages over conventional approaches and that changes may be made in form and detail without departing from the scope of the present disclosure. Thus, the present disclosure is limited only by the claims.

What is claimed is:

1. A method comprising:
   receiving a multichannel audio signal from a plurality of audio input components;
   determining whether the multichannel audio signal includes target audio associated with an audio source;
   transforming the multichannel audio signal to a time-frequency domain vector associated with a plurality of frequency sub-bands;
   computing a noisy-speech covariance matrix as a function of the time-frequency domain vector where the target audio is present;
   computing a noise-only covariance matrix as a function of the time-frequency domain vector where the target audio is absent;
   estimating a location of the audio source relative to the plurality of audio input components based on the noisy-speech covariance matrix and the noise-only covariance matrix; and
   processing the multichannel audio signal to generate an audio output signal by enhancing the target audio in the multichannel audio signal based on the estimated relative location.

2. The method of claim 1, wherein the estimating of the relative location of the audio source comprises:
   estimating a target speech relative transfer function based on an eigenvalue decomposition of the noisy-speech covariance matrix and the noise-only covariance matrix.

3. The method of claim 1, further comprising computing a modified covariance-based localization to identify time difference of arrival.

4. The method of claim 1, further comprising determining whether an input audio frame is a speech frame or a non-speech frame.

5. The method of claim 1, further comprising constructing a steering matrix for each of a plurality of frequency bands, using one of the audio input components as a reference.

6. The method of claim 1, further comprising computing a relative transfer function-based covariance when speech is active.

7. The method of claim 1, further comprising constructing directional covariance matrix coherently aligned across frequency bands.

8. The method of claim 1, further comprising determining a direction that minimizes beam power subject to distortionless criteria; and picking a time difference of arrival that yields a maximum likelihood of the target audio associated with the audio source.

9. A system comprising:
   a plurality of audio input components configured to generate a plurality of audio input signals; and
   a logic device configured to:
      determine whether the plurality of audio signals includes target audio associated with an audio source;
      transform the plurality of audio signals to a time-frequency domain vector associated with a plurality of frequency sub-bands;
      compute a noisy-speech covariance matrix as a function of the time-frequency domain vector where the target audio is absent;
      compute a noise-only covariance matrix as a function of the time-frequency domain vector where the target audio is present;

estimate a location of the audio source relative to the plurality of audio input components based on the noisy-speech covariance matrix and the noise-only covariance matrix; and process the plurality of audio signals to generate an audio output signal by enhancing the target audio based on the estimated relative location.

10. The system of claim 9, wherein the logic device is to estimate the location of the audio source by:

estimating a target speech relative transfer function based on an eigenvalue decomposition of the noisy-speech covariance matrix and the noise-only covariance matrix.

11. The system of claim 9, wherein the logic device is further configured to compute a modified covariance-based localization to identify time difference of arrival.

12. The system of claim 9, wherein the logic device is further configured to determine whether an input audio frame is a speech frame or a non-speech frame.

13. The system of claim 9, wherein the logic device is further configured to construct a steering matrix for each of a plurality of frequency bands, using one of the audio input components as a reference.

14. The system of claim 9, wherein the logic device is further configured to compute a relative transfer function-based covariance when speech is active.

15. The system of claim 9, wherein the logic device is further configured to construct a directional covariance matrix coherently aligned across frequency bands.

16. The system of claim 9, wherein the logic device is further configured to determine a direction that minimizes beam power subject to distortionless criteria; and picking a time difference of arrival that yields a maximum likelihood of the target audio associated with the audio source.

* * * * *